Jan. 24, 1928.

C. M. CRONKHITE 1,657,110

IRRIGATING VALVE

Original Filed March 16, 1922

INVENTOR.
Charles M. Cronkhite
BY
ATTORNEYS.

Patented Jan. 24, 1928.

1,657,110

UNITED STATES PATENT OFFICE.

CHARLES M. CRONKHITE, OF LOS ANGELES, CALIFORNIA, ASSIGNOR TO MARTIN IRON WORKS, A CORPORATION OF CALIFORNIA.

IRRIGATING VALVE.

Application filed March 16, 1922. Serial No. 544,287. Renewed July 1, 1927.

This invention relates to and has for a main object the provision of a satisfactory, economical, simple and efficient valve, capable of application in slightly modified form to metal surface standpipes and concrete surface stand pipes such as are used for irrigating orchards, truck gardens and the like, whereby an ample and continuous supply of water may be discharged into the irrigating furrows or ditches and readily operable for opening the valves to supply the water, and closing the same for shutting off the flow.

Another object is to provide a valve having a base with the discharge port therein, and a cover mounted thereon with a gasket interposed between said base and cover, and firmly held in position, said cover having a valve adjustably mounted thereon forming a closure for said discharge port, and arranged to be firmly held in position over said discharge port, and on said gasket for shutting off the flow of water when desired.

A still further object is to provide a valve having separable body members and a gasket tightly held therebetween, one of said members being attachable to a surface stand pipe and having a discharge port formed therein, and the other member having a screw operated valve adapted to be firmly held against said gasket for closing said discharge port to prevent the discharge of water through the valve.

Other minor and detailed objects will appear as the description progresses.

In the accompanying drawings I have shown two practical embodiments of my invention, one of which is a slight modification of the other, adapted for the same use but for attachment to different kinds of stand pipes.

In said drawings:

Fig. 2 is a plan view of another form of valve embodying substantially the same features as shown in Fig. 1, but of larger size, and adapted particularly for attachment to a concrete stand pipe, such as is used in orchards, and the like.

Figure 1:
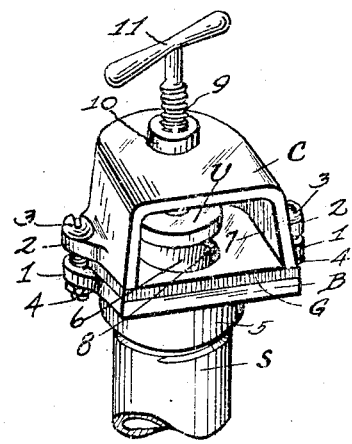
Fig. 1 is a perspective view of my improved valve adapted for attachment to a metal surface stand pipe.

As shown in Fig. 1, my invention contemplates the provision of a small form of valve adapted for use on metal surface pipes, as at S, such as are used in small orchards, truck gardens and the like, and the valve proper includes a base B, and a cover C. Said base has a pair of lugs 1, 1, on the side thereof which are alined with a pair of similar lugs 2, 2, on the sides of the cover C, and both pairs of said lugs are adapted to receive bolts 3, 3, with nuts 4, 4, on the ends thereof for attaching said base and cover together. A gasket G of sheet rubber of the like is placed between the upper surface of base B and the lower edge of cover C, so that when the bolts 3, 3, are tightened, the body and cover will be drawn tightly together against the gasket G and serve to hold said gasket firmly in position in the valve.

Base B has a neck 5 on the bottom which may be internally threaded to receive the upper threaded end of the stand pipe S for holding the valve in position on the said stand pipe, and said base has an outlet port 6 formed centrally therein through which water from the stand pipe may be discharged upwardly into the chamber 7 within cover C. Gasket G also has an opening 8 which fits over the outlet port 6 of the base.

A valve disc V of larger diameter than the opening 6 and 8 in the base and gasket respectively, is mounted centrally over said opening on the cover C by means of a stem 9 which is threaded into a central boss 10 on the top of the cover C, and has an operating handle 11 either attached to or formed on the upper end thereof, while the lower end of said stem is suitably connected with valve V. It will thus be apparent that when the handle 11 is turned in a given direction, the stem 9 and valve V will move downwardly, the lower surface of valve V will engage the upper surface of gasket G, around the opening 8 therein, and will compress said gasket sufficiently to close the outlet port 6 and prevent a discharge of water therefrom.

Figure 2:
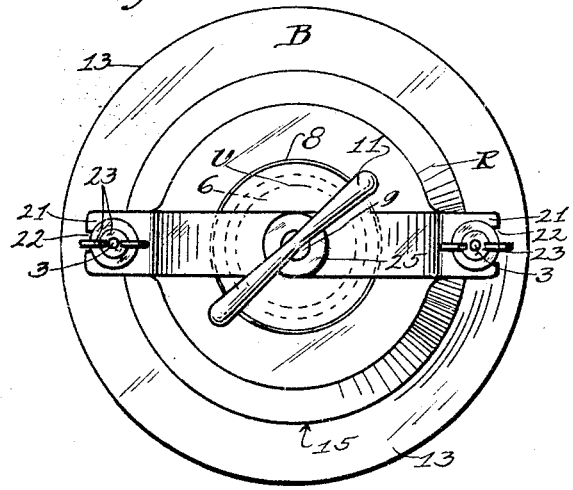
Figure 4:
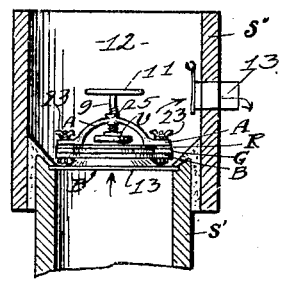
Fig. 4 is a reduced sectional elevation of a concrete stand pipe, showing the valve disclosed in Figs. 2 and 3 in operative position therein.
Figure 3:
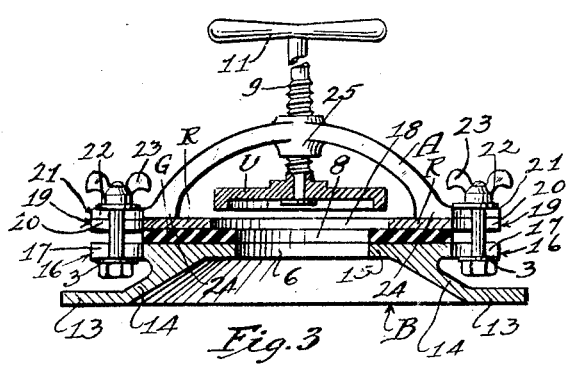
Fig. 3 is a sectional elevation of the same.

In the other form of device shown in Figs. 2, 3 and 4, the valve is adapted to be attached to the upper end of a concrete stand pipe S' of relatively large diameter, which has a short section of pipe of larger diameter than the stand pipe as at S″ cemented to said stand pipe, and providing a water chamber 12 above the valve. An ordinary form of sheet metal gate valve, as at 13, is usually provided in the wall of the pipe S″ through which the water is discharged from the chamber 12 of pipe S″.

Now, in the form of valve shown attached to the stand pipe S′, the base B is provided with an annular flange 13 which is adapted to seat in a corresponding rabbet in the top of stand pipe S′, and the central portion 14 is conical in form and terminates in a flat circular portion 15 substantially above the level of flange 13. The portion 15 of base B has a pair of diametrically alined lugs 16, 16, with notches 17, 17, formed therein, and in the center of the top 15 of the base, an outlet port 6 is formed. A gasket G of annular form is held on the upper surface of the base B and is provided with the central opening 8 as in the case of the smaller valve which corresponds to the outlet port 6 of the base. Said gasket is held in position by means of an annular retaining ring R which has a central opening 18 formed therein of larger diameter than the opening 6 and 8 in the base, and gasket respectively, and said ring is provided with a pair of diametrically alined lugs 19, 19, which correspond to the lugs 16, of base B, and are similarly notched as at 20, 20.

The upper member A in this form of valve is substantially different from the cover C shown in Fig. 1, inasmuch as instead of providing a cover over the openings 6, 8 and 18 in the base B, gasket G, and ring R, I provide only a metal arched bar, as at A, with oppositely alined feet 21, 21, having notches 22, 22 therein corresponding to the notched lugs 16, 16 of the base and 19, 19 of the ring R.

Now, the members A, R, G and B are tightly held together by means of the bolts 3, 3, which are provided at their upper ends with nuts 23, 23, whereby the parts may be readily attached together and separated when the valve is assembled and disassembled, respectively. The heels 24, 24, of the arched member A are so formed that they press against the upper surface of the ring R at opposite points, and serve to tightly clamp said ring against the gasket so as to prevent a leakage of water around the outlet port of the base. Member A has a central boss 25 through which the valve stem 9 is threaded, and the valve V is carried on the lower end of said stem and serves to close the outlet port 6 in the same manner as shown in Fig. 1, except that the valve V seats within the opening 18 of the ring R against the annular portion of the gasket G within said opening.

It will, of course, be understood that in the form of device shown in Figs. 2, 3 and 4, the parts are necessarily of substantially greater size and strength than the smaller device shown in Fig. 1. As shown in Fig. 3 in the larger type of valve the base B of the valve is held on the top of stand pipe S′ by means of a cement grilling 25.

It will be understood that in my invention as hereinbefore shown and described, I have provided a thoroughly simple and practical and efficient valve for the purposes mentioned, capable of being readily applied by unskilled labor to stand pipes such as are used in orchards, truck gardens, and the like, and also capable of being readily assembled and disassembled for the purposes of replacing the gasket G or for other purposes, and it is conceived to be possible that I may alter or modify the structure of my improvements within the scope of the appended claim without departing from the spirit of my invention.

What I claim is:

An irrigating valve comprising a base member having a flanged lower portion adapted for closing the upper end of a stand pipe, a flanged upper portion of smaller diameter than said lower portion provided with a centrally disposed outlet therein, a gasket carried on said upper portion and having an opening corresponding to said outlet, a cover above said gasket and having an opening of greater diameter than said outlet, the upper portion of said base and said cover having correspondingly formed lugs on the periphery thereof, bolts for holding said cover onto said base, and extended through said lugs, an arm integrally formed on said cover and extending diametrically thereacross, and substantially above the opening therein, a manually operable screw carried on said arm and disposed centrally of said outlet, and a valve member having an annular bearing surface extensible into and from the opening in said cover for engagement with said gasket, whereby said outlet may be closed.

CHARLES M. CRONKHITE.